(12) United States Patent
Agrawal et al.

(10) Patent No.: US 7,960,688 B2
(45) Date of Patent: Jun. 14, 2011

(54) PHOTOLUMINESCENT MARKINGS WITH FUNCTIONAL OVERLAYERS

(75) Inventors: Satish Agrawal, Concord, MA (US); Edward Kingsley, Stow, MA (US)

(73) Assignee: Performance Indicator LLC, Lowell, MA (US)

( * ) Notice: Subject to any disclaimer, the term of this patent is extended or adjusted under 35 U.S.C. 154(b) by 48 days.

(21) Appl. No.: 12/487,362

(22) Filed: Jun. 18, 2009

(65) Prior Publication Data

US 2010/0320371 A1    Dec. 23, 2010

(51) Int. Cl.
*G06K 7/10* (2006.01)
(52) U.S. Cl. .................................................... 250/271
(58) Field of Classification Search .......... 250/271, 250/461.1–461.2, 473.1, 484.5; 235/491, 235/439; 427/7
See application file for complete search history.

(56) References Cited

U.S. PATENT DOCUMENTS

| | | | | |
|---|---|---|---|---|
| 4,387,112 | A | * | 6/1983 | Blach .............................. 427/7 |
| 4,451,530 | A | | 5/1984 | Kaule et al. |
| 6,506,476 | B1 | * | 1/2003 | Kaule et al. ................. 428/195.1 |
| 2008/0116272 | A1 | * | 5/2008 | Giering et al. ................. 235/439 |
| 2008/0121815 | A1 | * | 5/2008 | Agrawal et al. ............ 250/473.1 |
| 2008/0121818 | A1 | | 5/2008 | Agrawal et al. |
| 2008/0185557 | A1 | | 8/2008 | Agrawal et al. |

FOREIGN PATENT DOCUMENTS

FR    2484922 A1    12/1981

OTHER PUBLICATIONS

Xiao et al., "Broadband infrared emission from Er-Tm:Al2O3 thin films," 2005, Applied Physics Letters, vol. 87, pp. 111103-1111103-3.*
Xiao, Z., "Broadband infrared emission from ER-TM: Al2O3 thin films," Applied Physics Letters 87, American Institute of Physics (2005).
Notification of Transmittal of the International Search Report and the Written Opinion of the International Searching Authority, or the Declaration, International Application No. PCT/US2010/039169, filed on Jun. 18, 2010.

* cited by examiner

*Primary Examiner* — David P Porta
*Assistant Examiner* — Kiho Kim
(74) *Attorney, Agent, or Firm* — Burns & Levinson LLP; Orlando Lopez

(57) ABSTRACT

Disclosed are photoluminescent markings that contain a photoluminescent layer and one or more functional overlayers wherein the photoluminescent marking has an emission signature that lies partly or fully in the infrared region of the electromagnetic spectrum. One functional overlayer conceals the photoluminescent layer and blends into the background or blends with marks that are normally present, without significantly reducing the luminescent intensity of the photoluminescent layer. Another functional overlayer provides photolytic stability to the underlying photoluminescent layer. Also disclosed are functional overlayers that enhance the daytime observability of the infrared emissions. A further functional overlayer prevents the observability of a printed message with the naked eye. A combination of functional overlayers each providing a different function is also included. Also disclosed are a multifunctional overlayer and methods of creating and using the inventive photoluminescent markings as well as objects containing the inventive photoluminescent markings.

22 Claims, 8 Drawing Sheets

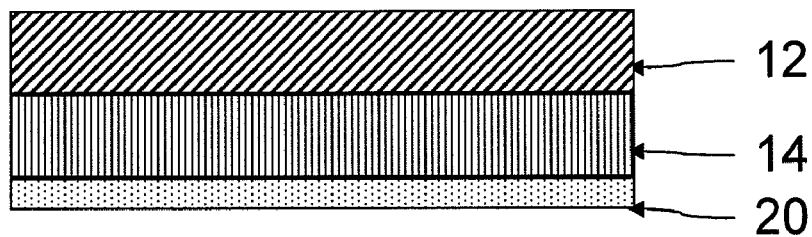
FIGURE 8a
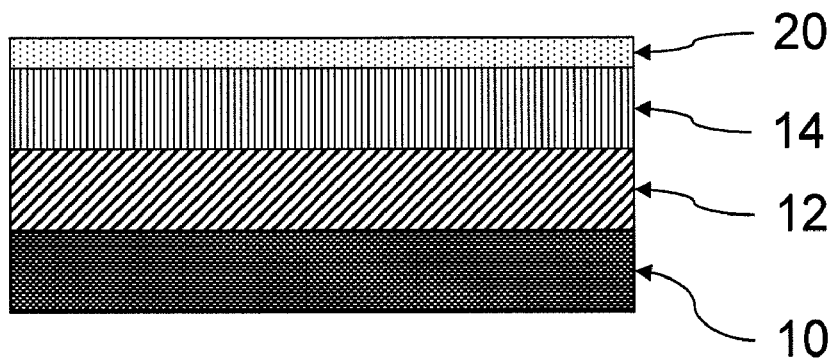
FIGURE 8b
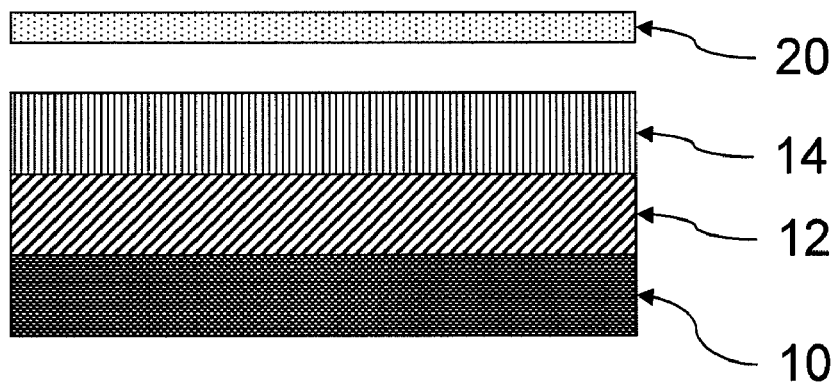
FIGURE 8c
FIGURE 8

PHOTOLUMINESCENT MARKINGS WITH FUNCTIONAL OVERLAYERS

FIELD OF THE INVENTION

The present invention relates generally to photoluminescent markings that can be used for stealth detection and further wherein the functionality of such photoluminescent markings is enhanced with the use of one or more functional overlayers, that is, one or more layers applied over the photoluminescent layer. The functional overlayers can render the daylight color of the photoluminescent markings to a wide range of colors, or increase the stability of the photoluminescent markings against photolytic degradation of the infrared emissions from such markings, or enhance the daylight detectability of such markings, or enable a printed message to be camouflaged, or combinations thereof. The present invention also relates to objects containing the markings and methods of using them.

BACKGROUND OF THE INVENTION

Photoluminescent materials and compositions that contain photoluminescent phosphorescent materials which have emissions in the visible region of the electromagnetic spectrum have been disclosed. For example, metal sulfide pigments which contain various elemental activators, co-activators and compensators have been prepared which absorb at 200-400 nm and have an emission spectrum of 450-520 nm. Further examples of sulfide photoluminescent phosphorescent materials that have been developed include CaS:Bi, which emits violet blue light; CaStS:Bi, which emits blue light; ZnS:Cu, which emits green light; and ZnCdS:Cu, which emits yellow or orange light.

The term "persistence" of phosphorescence is generally a measure of the time, after discontinuing irradiation, it takes for phosphorescence of a sample to decrease to the threshold of eye sensitivity. The term "long-persistent phosphor" historically has been used to refer to ZnS Cu, CaS:Eu,Tm and similar materials which have a persistence time of only 20 to 40 minutes.

Recently, phosphorescent materials that have significantly higher persistence, up to 12-16 hours, have been reported. Such phosphors generally comprise a host matrix that can be alkaline earth aluminates (oxides), alkaline earth silicates, or alkaline earth alumino-silicates.

Although methods for uniquely marking and identifying objects have received thought and attention, such methods do not enable stealth detection. Thus, stealth detection refers to a method of identification wherein the emissions from the photoluminescent markings are not ordinarily observable by a human observer but detectable by friendly agents or friendly forces with specific detection equipment, and further wherein activation is not required during detection. This condition of not requiring activation during detection is important for the concept of stealth detection as the energy required for activation, such as by using a laser, is potentially detectable and hence revealing of the presence of the detector. Markings that enable stealth detection will be of high value in the combat theater for combat equipment or personnel. High persistence markings with emissions in the infrared region for stealth detection or stealth identification have been disclosed in U.S. Pat. Appl. No. 2008/185,557 and U.S. Pat. Appl. No. 2008/121,818 both to Agrawal et al.

Whether the photoluminescent markings enable stealth detection or not the specific marking itself may not be a stealth marking. Stealth markings are those wherein the markings themselves are created such that it is not readily apparent that the object has been marked for identification. This can only be achieved when the daylight color of the photoluminescent markings enable either the markings to blend in with the area surrounding the marking so as not to be distinguishable from the surrounding area, or wherein their daylight color is such that it is revealing of a marking that is normally present, such as a white or yellow color road marking. Photoluminescent markings that have emission in the infrared, such as those in referenced in U.S. Pat. Appl. No. 2008/185,557 and U.S. Pat. Appl. No. 2008/121,818, will generally be dark in color. Hence they can function as stealth markings only in very limited situations. The prior art is silent on how to make these markings function as stealth markings in a wide variety of environments.

In the field of markings for identification there is a need for markings that not only enable stealth detection or stealth identification but wherein the markings themselves are created such that it is not readily apparent that the object has been marked for identification, that is, the marking is a stealth marking. Such markings will be of great value in a variety of anti-terrorist activities, in the combat theater and also in anti-counterfeiting applications. The use of a functional overlayer, that is, a layer applied over the photoluminescent layer which contains carefully selected colorants can be of great value in adjusting the daylight color of photoluminescent markings that have emissions either partially or wholly in the infrared, whether or not the markings have been enabled for stealth detection, thereby camouflaging the presence of the marking.

Infrared emitting markings cited in U.S. Pat. Appl. No. 2008/185,557 and U.S. Pat. Appl. No. 2008/121,818 both to Agrawal et al have also disclosed the use an overlayer on top of the photoluminescent layer for the purpose of protecting the photoluminescent layer from physical damage and/or ensuring that any residual visible emission will not be detected. However there is no disclosure in these applications for the use of an overlayer to adjust the daylight color of the photoluminescent marking so as to render it as a stealth marking. These applications also do not disclose the use of an overlayer to enhance the daylight detectability of the photoluminescent markings. Nor do these applications disclose the use of an overlayer for the enhancement of photolytic stability of the underlying photoluminescent layer.

Photoluminescent materials, even if they are inorganic materials, can be subject to photolytic degradation. Even though ZnS phosphorescent materials have been known for a long time, their use for outdoor applications has been precluded because of photolytic instability. Additionally fluorescent materials, including fluorescent materials contemplated in this invention, can be sensitive to degradation by photolytic activity. Although use of UV absorbers, singlet oxygen scavengers, anti-oxidants, HALS (hindered amine light stabilizers) have been widely reported in the literature, such materials, by themselves, are not sufficient to impart the required photolytic stability of the markings of this invention to promote outdoor use of such markings.

It can therefore be seen from the above discussions that there is a need for photoluminescent markings whose emission is partly or fully in the infrared region of the electromagnetic spectrum, such emissions being suitable for stealth detection or not, wherein the markings have adjustable daylight color, or have improved photolytic stability, or have enhanced daylight detectability, or combinations thereof. There is also a need for methods of creating and using the inventive photoluminescent markings as well as objects containing the photoluminescent markings.

SUMMARY OF THE INVENTION

The present invention provides for photoluminescent markings that contain a photoluminescent layer which has an emission signature that lies partly or fully in the infrared region of the electromagnetic spectrum and one or more functional overlayers applied over the photoluminescent layer. Such functional overlayers can be used, for example, to significantly increase the range of daylight colors attainable by such photoluminescent markings so as to enhance their use as stealth markings, or to significantly increase the photolytic stability of such markings, or to enhance the detectability of the photoluminescent layer in daylight, or to camouflage a printed message, or combinations thereof, while at the same time minimally impacting the infrared emissions from such markings. Other functional layers may be envisioned to include, for example, layers which reduce or eliminate any residual visible radiation, layers which increase the efficiency of converting the exciting or activating radiation to infrared, and/or layers to aid in the activation of the photoluminescent underlayer. The use of multiple functional overlayers will result in achieving multiple functionalities as described above. The photoluminescent layer over which the functional layers are applied may contain one or more photoluminescent phosphorescent materials, one or more photoluminescent fluorescent materials or a combination thereof.

It should be pointed out that when the functional overlayer is used for concealment, that is, for stealth marking, it contains materials which conceal the presence of the photoluminescent layer by independently adjusting the daylight color of the marking, that is, the visible color of the marking can be adjusted to be different from that of the photoluminescent layer. The use of the functional overlayer allows for a much greater degree of freedom in adjusting the daylight observable color. With the proper selection of the colorant materials, one can ensure that any reductions in intensity of the emissions from the photoluminescent layer are minimized, that is, that the functional overlayer has an adequate level of transparency both to the exciting radiation and to the infrared emissions.

Further, the present invention relates to methods of stealth detection by creating and using the inventive photoluminescent markings as well as to objects containing the inventive markings.

Thus, in a first aspect, the present invention provides for photoluminescent markings which contain a photoluminescent layer which contain selected photoluminescent materials and one or more functional overlayers wherein the markings emit fully or partially in the infrared region of the electromagnetic spectrum.

In a second aspect, the present invention provides for photoluminescent markings which contain a photoluminescent layer which contain selected photoluminescent materials and one or more functional overlayers that contain selected colorants that adjust the daylight color of the markings to either blend imperceptibly with the surrounding area of an object to which the markings are applied or to indicate a marking that would normally be present, wherein the markings emit fully or partially in the infrared region of the electromagnetic spectrum.

In a third aspect, the present invention provides for photoluminescent markings which contain a photoluminescent layer which contain selected photoluminescent materials and one or more functional overlayers that contain selected materials which have absorptions in selected regions of the electromagnetic spectrum so as to increase the photolytic stability of the markings, wherein the markings emit fully or partially in the infrared region of the electromagnetic spectrum.

In a fourth aspect, the present invention provides for photoluminescent markings which contain a photoluminescent layer which contain selected photoluminescent materials and one or more functional overlayers that contain selected materials that enhance the daylight observability of the infrared emission, wherein the markings emit fully or partially in the infrared region of the electromagnetic spectrum.

In a fifth aspect, the present invention provides for photoluminescent markings which contain a photoluminescent layer which contain selected photoluminescent materials and a functional overlayer that contains selected materials that increase the photolytic stability of the markings, and a second functional overlayer that contains selected colorants that adjust the daylight color of the markings to either blend imperceptibly with the surrounding area of an object to which the markings are applied or to indicate a marking that would normally be present, wherein the markings emits fully or partially in the infrared region of the electromagnetic spectrum.

In a sixth aspect, the present invention provides for photoluminescent markings which contain a photoluminescent layer which contain selected photoluminescent materials and a functional overlayer that contains selected materials that enhance the daylight observability of the infrared emission, and a second functional overlayer that contains selected colorants that adjust the daylight color of the markings to either blend imperceptibly with the surrounding area of an object to which the markings are applied or to indicate a marking that would normally be present, wherein the markings emits fully or partially in the infrared region of the electromagnetic spectrum.

In a seventh aspect, the present invention provides for photoluminescent markings which contain a photoluminescent layer which contain selected photoluminescent materials and a functional overlayer that contains selected materials that enhance the daylight observability of the infrared emission, and a second functional overlayer that contains selected materials that increase the photolytic stability of the markings and a third functional overlayer that contains selected colorants that adjust the daylight color of the markings to either blend imperceptibly with the surrounding area of an object to which the markings are applied or to indicate a marking that would normally be present, wherein the markings emits fully or partially in the infrared region of the electromagnetic spectrum.

In an eighth aspect, the present invention provides for, photoluminescent markings which contain a photoluminescent layer which contain selected photoluminescent materials and a functional overlayer that contains selected colorants used for the purpose of camouflaging a printed message which can be text, graphs, numerical or combinations thereof, and which has been printed on either the photoluminescent layer, or one of the functional overlayers of the aforementioned aspects or on combinations thereof.

In a ninth aspect, the present invention provides for photoluminescent markings which contain a photoluminescent layer which contain selected photoluminescent materials and a functional overlayer that contains selected colorants that adjust the daylight color of the markings to either blend imperceptibly with the surrounding area of an object to which the markings are applied or to indicate a marking that would normally be present, and/or selected stabilizing materials that increase the photolytic stability of the markings, and/or selected materials that enhance the daylight observability of the infrared emission, and/or selected materials which camouflage a printed message which has been printed on either the photoluminescent layer, or one of the functional overlayers of the aforementioned aspects or on combinations thereof, wherein the markings emits fully or partially in the infrared region of the electromagnetic spectrum.

In a tenth aspect, the present invention provides for photoluminescent markings of the foregoing markings aspects wherein any or all of the functional overlayer is generally between 25 and 350 microns when dry.

In an eleventh aspect, the present invention provides for a reflective layer under the photoluminescent layers of the photoluminescent markings of any of the aforementioned aspects of the inventive markings.

In a twelfth aspect, the present invention provides for photoluminescent markings which contain a photoluminescent layer which contain selected photoluminescent materials and a functional overlayer that contains selected colorants used for the purpose of camouflaging a printed message which can be text, graphs, numerical or combinations thereof, and which has been printed on the reflective layer below the photoluminescent layer.

It should be noted that the functional overlayer that is used for rendering the marking as a stealth marking, that is, the functional overlayer in which the daylight color is adjusted so as to either blend imperceptibly with the surrounding area of an object to which the marking is applied, or, when applied to objects that typically have non-photoluminescent markings for traditional usage, renders a daylight color indicative of such traditional markings, the layer has to be the top most observable layer so as to form the visible top surface of the stealth marking.

In an thirteenth aspect, the present invention provides for photoluminescent marking of the foregoing marking aspects wherein the photoluminescent layer over which the functional overlayers are applied contain one or more photoluminescent phosphorescent materials, one or more photoluminescent fluorescent materials or a combination thereof.

In a fourteenth aspect, the present invention provides for methods of detecting or identifying a photoluminescent marking containing the steps of applying a photoluminescent marking of any of the aforementioned marking aspects onto at least a portion of an object, then activating or charging the marking and detecting the infrared emission.

BRIEF DESCRIPTION OF THE DRAWINGS

In FIG. 8, FIG. 8a illustrates a carrier layer (20) upon which has been applied a functional overlayer of the current invention (14), and further a photoluminescent layer of the current invention (12). FIG. 8b illustrates the application of the construct in FIG. 8a to an object (10) such that the photoluminescent layer (12) is in intimate contact with the object (10). FIG. 8c illustrates the construct of FIG. 8b after the carrier layer (20) has been removed.

DETAILED DESCRIPTION OF THE INVENTION

Figure 1:
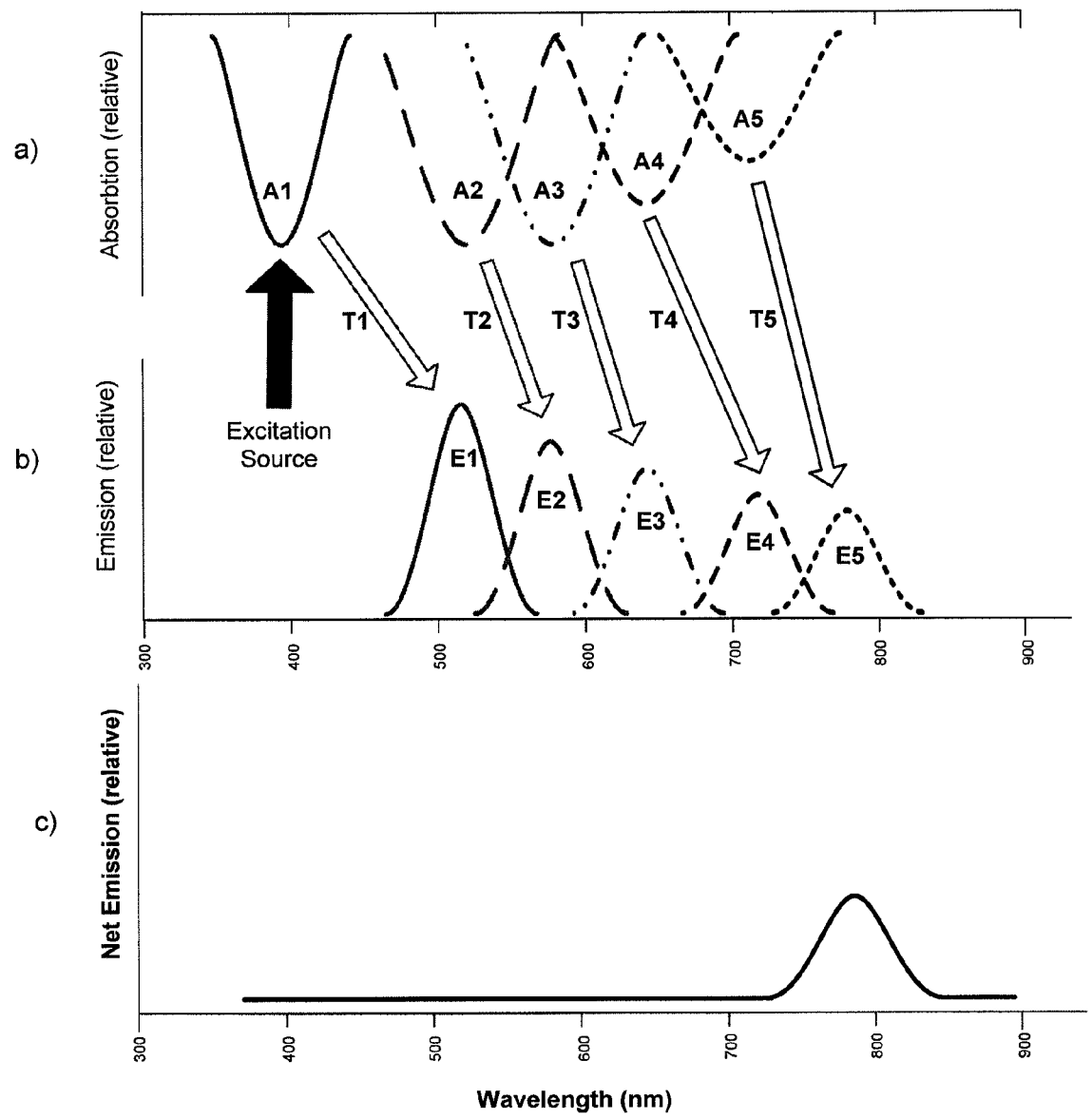
FIG. 1 illustrates a shift in emission spectra resulting from incorporation of photoluminescent phosphorescent and photoluminescent fluorescent dyes. Chart a) is the representative absorbance spectra, b) is the representative emission spectra and c) is the representative net emission spectrum resulting from the inventive composition. As illustrated, a photoluminescent phosphorescent material absorbs radiation at A1 from an excitation source. The photoluminescent phosphor can continuously emit radiation E1 which overlaps with the absorption spectra A2 which emits radiation at E2. E2 again is designed to overlap with the absorption A3 which emits radiation E3. This process can continue until a final desired emission is obtained, in this case E5. As can be seen from chart c) the composition is designed to emit radiation at approx. 780 nm.
Figure 2:
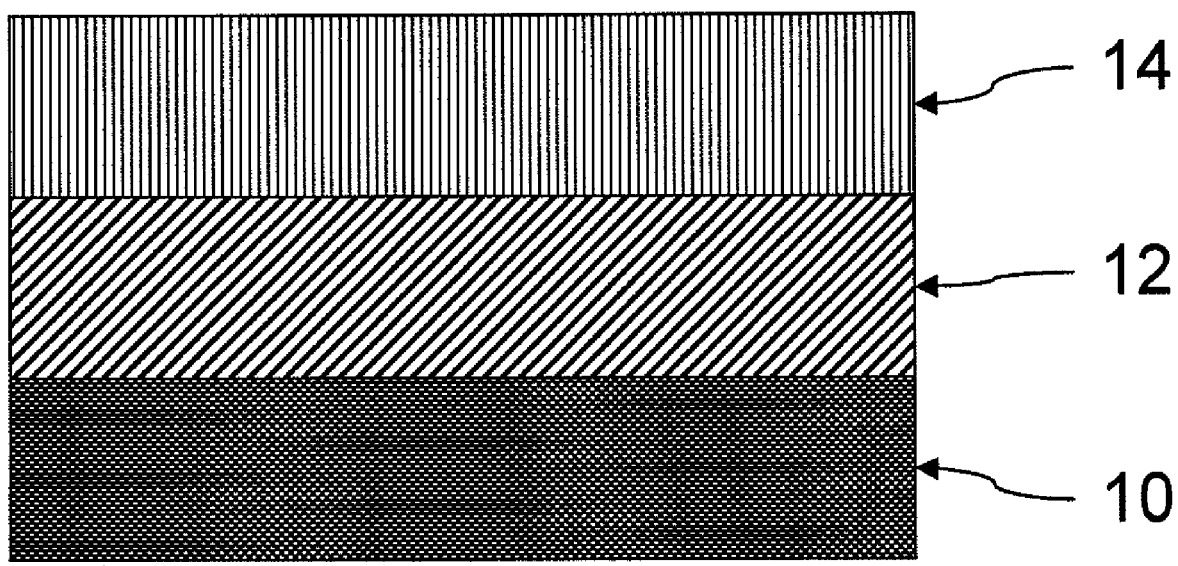
FIG. 2 illustrates an object (10) upon which has been applied a photoluminescent layer of the current invention (12), and a functional overlayer (14) of the current invention.
Figure 3:
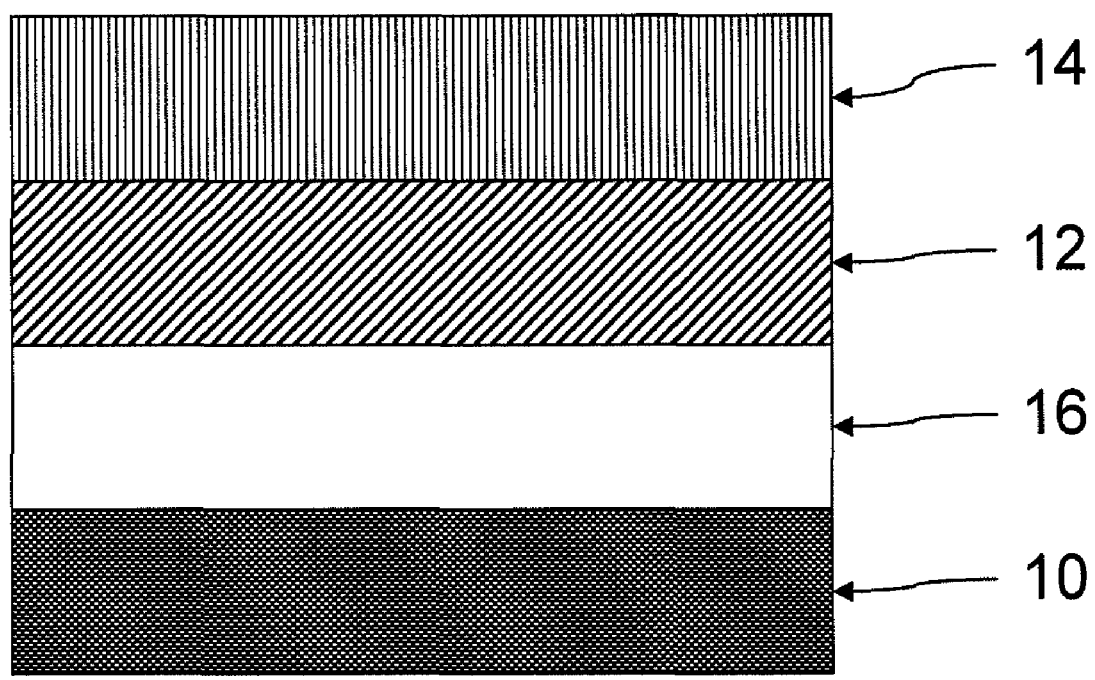
FIG. 3 illustrates an object (10) upon which has been applied a reflective layer (16), a photoluminescent layer of the current invention (12), and further a functional overlayer (14) of the current invention.
Figure 4:
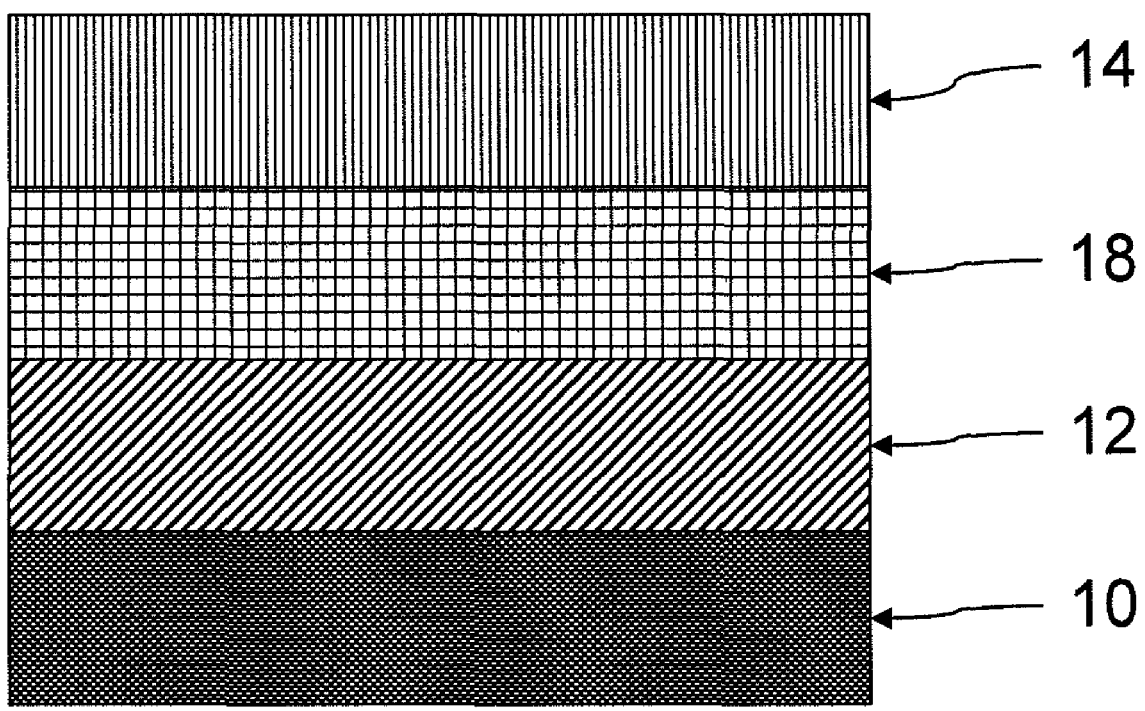
FIG. 4 illustrates an object (10) upon which has been applied a photoluminescent layer of the current invention (12), a functional overlayer of the current invention (14), and further a second functional layer of the current invention (18) beneath the functional overlayer (14).
Figure 5:
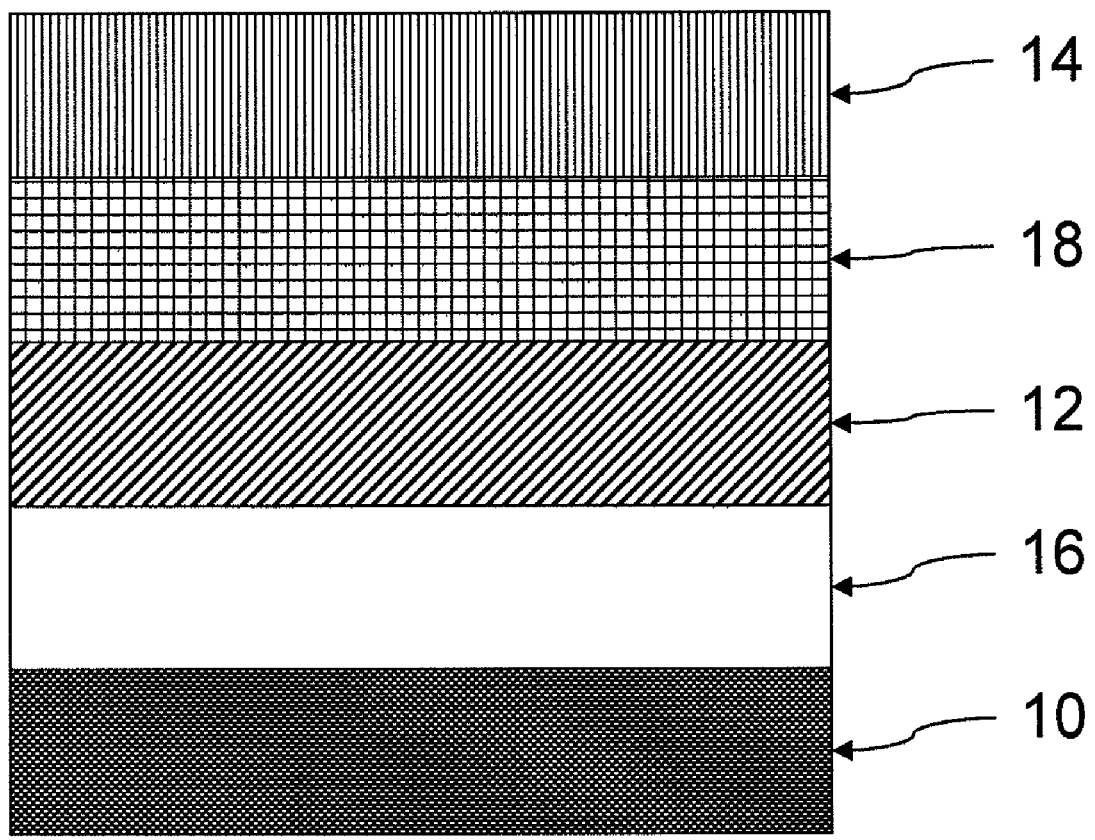
FIG. 5 illustrates an object (10) upon which has been applied a reflective layer (16), a photoluminescent layer of the current invention (12), a functional overlayer of the current invention (14), and further a second functional layer of the current invention (18) beneath the functional overlayer (14).
Figure 6:
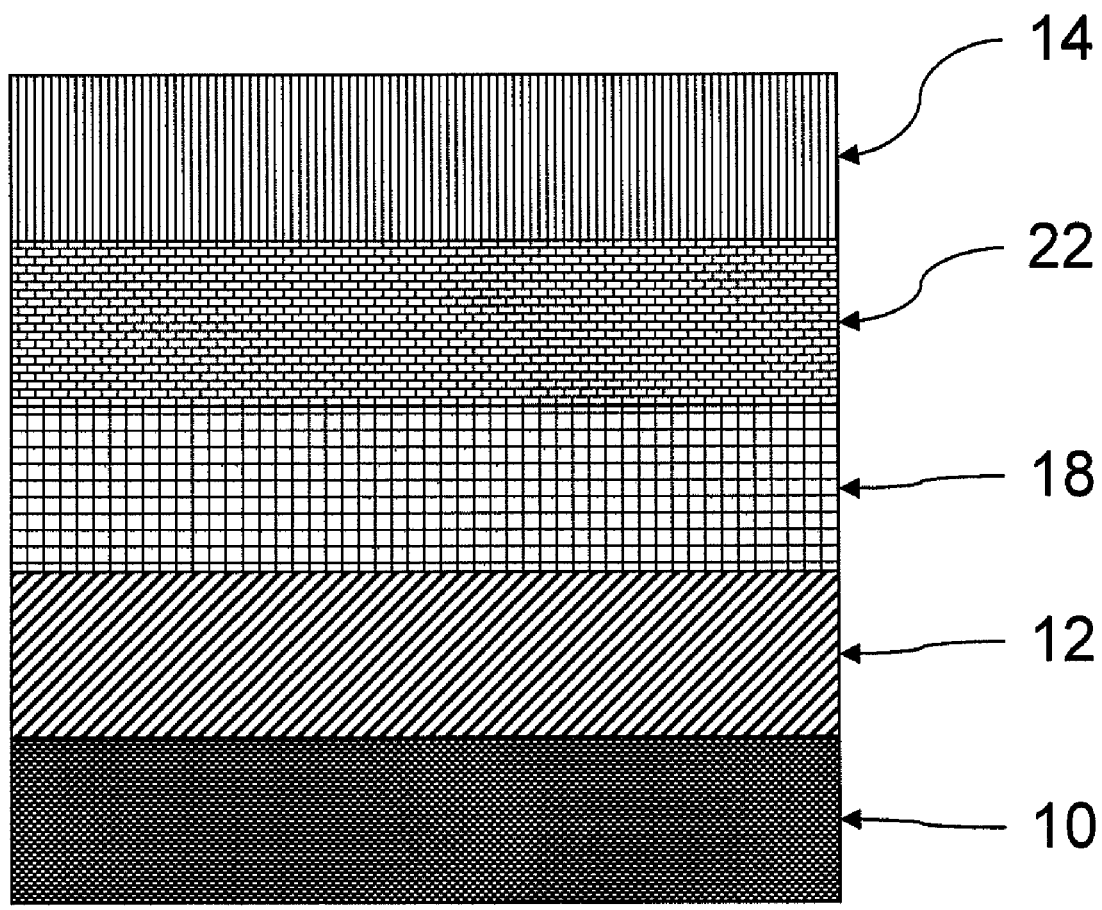
FIG. 6 illustrates an object (10) upon which has been applied a photoluminescent layer of the current invention (12), a functional overlayer of the current invention (14), and further a second functional layer of the current invention (18) and a third functional overlayer of the current invention (22), both beneath the functional overlayer (14).
Figure 7:
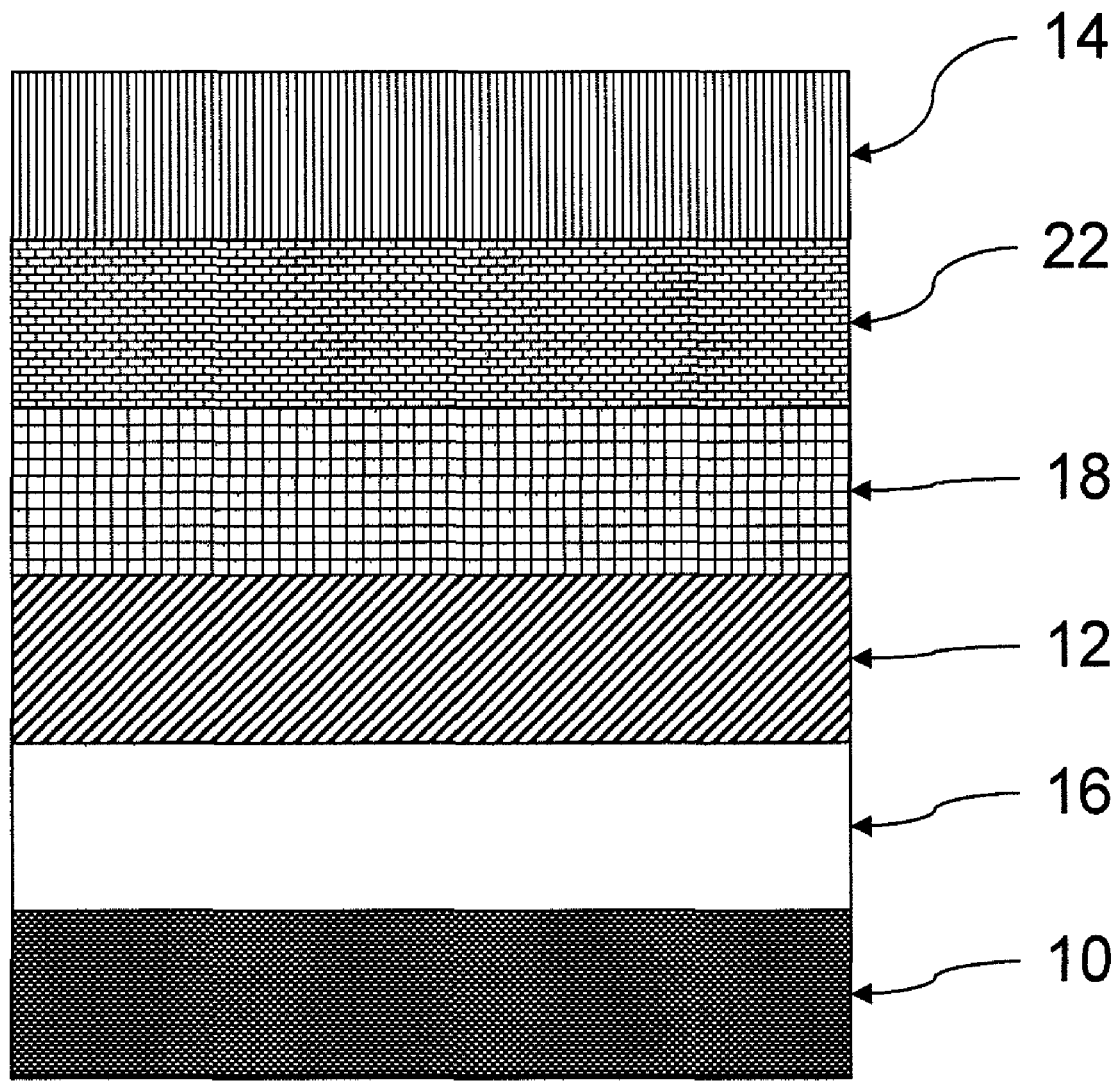
FIG. 7 illustrates an object (10) upon which has been applied a reflective layer (16), a photoluminescent layer of the current invention (12), a functional overlayer of the current invention (14), and further a second functional layer of the current invention (18) and a third functional overlayer of the current invention (22), both beneath the functional overlayer (14).

In the current invention, detection whether it is stealth or otherwise, results from photoluminescent layers containing photoluminescent materials that have emissions in the infrared region of the electromagnetic spectrum, and further wherein the value of such markings have been enhanced by the use of one or more functional overlayers. One such functional overlayer contains materials that adjust the daylight color of the photoluminescent stealth markings so as to either be indicative of a marking that might be normally present or to blend with the surrounding area of the object to which the marking is applied thereby enhancing the value of the marking by rendering it as a stealth marking. Other functional overlayers of the current invention contain selected materials that increase the photolytic stability of the markings. Another functional overlayer of the current invention contains selected materials that enhance the daylight observability of the marking. Another functional overlayer contains materials that camouflage a printed message which can be printed on either the reflective surface, or the photoluminescent layer, of any of the underlying functional overlayers or combinations thereof. The overlayers of the present invention are designed to have minimal impact on both the excitation region that activates the photoluminescent markings as well as the infrared emissions from the markings.

Unless otherwise noted, percentages used herein are expressed as weight percent.

As used herein, "photoluminescent" materials are luminescent materials that are capable of being excited by electromagnetic radiation and "photoluminescence" is the emission of electromagnetic radiation caused by the excitation.

As used herein, a "phosphorescent" material is a material that has the ability to be excited by electromagnetic radiation into an excited state, but the stored energy is released gradually. Emissions from phosphorescent materials have persistence, that is, emissions from such materials can last for seconds, minutes or even hours after the excitation source is removed. The released energy may be in the form of UV, visible or infrared radiation.

As used herein, a "fluorescent" material is a material that has the ability to be excited by electromagnetic radiation into an excited state and which releases energy in the form of electromagnetic radiation rapidly, after excitation. Emissions from fluorescent materials have no persistence, that is, emission essentially ceases after an excitation source is removed. The released energy may be in the form of UV, visible or infrared radiation.

As used herein, "luminescence", "phosphorescence" or "fluorescence" is the actual release of electromagnetic radiation from a luminescent, phosphorescent or fluorescent material, respectively.

As used herein "persistence" is defined as the time it takes, after discontinuing irradiation, for photoluminescent emissions emanating from a photoluminescent object to decrease to the threshold detectability with a suitable detection apparatus.

As used herein "high persistence" is defined to mean that the time it takes, after discontinuing irradiation, for photoluminescent emissions emanating from a photoluminescent object to decrease to the threshold detectability with a suitable detection apparatus is greater than three hours.

As used herein, "electromagnetic radiation" refers to a form of energy containing both electric and magnetic wave components which includes ultraviolet (UV), visible and infrared (IR) radiation.

As used herein, an "emission signature" refers to the specific emission spectrum of the photoluminescent composition as a result of activation, such emission being characterizable by wavelength, amplitude and/or other desired parameters.

As used herein, "Stokes shift" refers to the difference in wavelength between the excitation or activation wavelength and the emission wavelength of photoluminescent materials.

As used herein, a "liquid carrier" is a liquid that acts as a carrier for materials distributed in a solid state and/or dissolved therein.

As used herein, a "layer" is a film resulting from a composition containing at least one film-forming polymeric resin and a liquid carrier that is substantially dry.

As used herein, a "photoluminescent layer" is defined as a layer comprised of an admixture of materials which is capable of emitting electromagnetic radiation from electronically-excited states when excited or charged or activated by electromagnetic radiation. It should be noted that the photoluminescent layer may contain one or more photoluminescent phosphorescent materials, one or more photoluminescent fluorescent materials, or combinations thereof.

As used herein, the term dried refers to the condition wherein approximately less than 12 weight % of a liquid carrier remains. Note that in addition, that is, beyond the residual liquid carrier, it is possible, if necessary, to also have plasticizer materials present in the dried layer.

As used herein "stealth identification" and "stealth detection" refer to the act of identifying or detecting a photoluminescent marking or an object containing the photoluminescent marking, wherein the emissions from the markings are ordinarily not visible to a human observer either during daytime or nighttime and wherein the photoluminescent markings are not required to be activated during detection (that is, activation and detection are decoupled spatially and temporally) and further wherein emissions from such markings require specific detection equipment for observation.

As used herein "spatially and temporally decoupled" means that detection can be practiced after the activation has ceased (temporally) as well as detection can occur away from the marking, or the object containing the marking and/or its activation source (spatially).

As used herein, a marking is defined as a "stealth marking" when it has been selectively formulated so that its daylight color blends in with the surrounding area upon which it has been placed or is indicative of a marking that is typically present for traditional usage.

As used herein the phrase "blending with the surrounding area" means that a photoluminescent marking intended to be a stealth marking is rendered such that its daytime color closely resembles the color of the surrounding area, or, when applied to objects that typically have non-photoluminescent markings for traditional usage, renders a daylight color indicative of such traditional markings, As used herein, the term "transmits" refers to the process of allowing energy to pass through a material, or layer.

As used herein, the term "colorants and colorant materials" includes materials that can adjust observable color by absorption only, and/or by fluorescence and/or by phosphorescence.

As used herein "CAS #" is a unique numerical identifier assigned to every chemical compound, polymer, biological sequences, mixtures and alloys registered in the Chemical Abstracts Service (CAS), a division of the American Chemical Society.

Photoluminescent markings of the current invention emit fully or partly in the infrared region of the electromagnetic spectrum that may or may not have been enabled for stealth detection. A key advantage of the photoluminescent markings of the current invention is that they can be formulated to be activated or excited without necessarily requiring specialized sources. In those cases wherein they are formulated so as to not require specialized activating sources, they can be charged with naturally-occurring illumination essentially for most of the day, be it during the morning, noon or evening, as well as on cloudy days, in addition to artificial sources such as metal halide lamps. Photoluminescent markings of this invention that have been enabled for stealth detection, whether activated by naturally or artificially occurring illumination, will not require activating equipment at the point of identification or detection, and will enable detection to be practices at daytime or nighttime and at locations away from the photoluminescent markings and/or its detection source, as well as after the activation of the marking has ceased. Further, with the use of high luminous intensity and persistent photoluminescent phosphorescent compositions such as those described below in the photoluminescent layer, stealth markings can be created that allow stealth detection at daytime or nighttime and can be practiced at great distances from the stealth markings and/or its activation source and long after activation has ceased.

For the case wherein the photoluminescent layer of the photoluminescent markings of the current invention contain only photoluminescent fluorescent materials so as to yield emissions either fully or partially in the infrared, the markings can be excited by electromagnetic radiation from the ultraviolet to the infrared region of the electromagnetic spectrum. It should be noted that emissions from such markings will not have persistence, that is, they are not enabled for stealth detection at nighttime. However, during daytime with natural illumination as well as typical artificial illumination they will not require separate activation equipment.

For the case wherein the photoluminescent layer of the photoluminescent markings of the current invention contains phosphorescent materials for persistence, such markings should be charged with electromagnetic radiation within the excitation spectrum of the phosphorescent materials which is generally in the UV and/or short blue region. When such phosphorescent materials have been admixed with fluorescent materials, the combination of which will emit fully or partially in the infrared region of the electromagnetic spectrum, the markings will be enabled for stealth detection when excited with electromagnetic radiation that is in the region of the excitation spectrum of the phosphorescent material. It should be noted however that because of the presence of fluorescent materials these markings will also be excited with radiation that overlaps with the excitation spectrum of any of the fluorescent materials.

The use of the combinations of photoluminescent materials and fluorescent materials, or for the case wherein only photoluminescent fluorescent materials are used in the photoluminescent layer, a certain daylight color will be imparted to the marking resulting from such a layer. Colorants in the form of pigments or dyes, added to the photoluminescent layers, wherein such colorants are absorptive of visible electromagnetic radiation, can be used to make some adjustments to the daylight color. However, not only will such color adjustment be extremely limited but they will interfere with the attainment of the desired infrared emissions.

It has now been discovered that by applying a functional overlayer over the photoluminescent layer one can attain a greater degree of freedom to adjust the daylight color, while at the same time minimizing any adverse impact on the infrared emission from the photoluminescent layer. By adding colorants, whether absorptive only, or fluorescent, or combinations thereof, to the functional layer will not only hide the darker color of the underlying photoluminescent layer, but will also enable the markings to be rendered in a variety of colors. It should be emphasized that the colorant materials for the functional overlayer should be selected such that they have adequate transparency to both the exciting and emitting radiation.

The functional overlayer is formulated to allow charging energy to pass through the functional overlayer to charge or activate the photoluminescent layer and at the same time allow the resultant infrared emissions to pass back out through the functional overlayer. The functional overlayer is formulated to create daylight color of the markings such that either the color of the marking blends with the color of the surrounding area of the surface or object to which the markings are applied, or to create a color that would be naturally present in the environment, such as, for example, a yellow or white stripe marking typically present on a road surface.

The functional overlayer can also be used for creating markings for the case of a surface or object that is multicolored, such as with a camouflage pattern. The colors of the markings can be adjusted to be similar to the various camouflage colors and the marking can be applied in more than one part so as to recreate the pattern and thus blend with the surrounding area.

Markings deploying the functional overlayers as described above can be used as stealth markings, whether for stealth identification or detection or not. Because the functional overlayer is formulated with selected colorants to blend in with the color of the surrounding area of the surface or object to which the markings are applied, it camouflages the presence of the underlying photoluminescent layer.

The markings of this invention which enable stealth detection and which have been rendered as stealth markings through the use of a functional overlayer are intended for use both in daylight and at nighttime. Normally, in the absence of a functional overlayer during daytime, the photoluminescent layer not only converts the emissions of the phosphorescent material into infrared emissions but also converts any incident visible radiation into infrared emission. The photoluminescent layer materials will also cascade any shorter wavelength energy, shorter relative to the final emission, into infrared emission. Thus, although the signal-to-noise ratio is a lot poorer in daylight, for example, using night vision scopes equipped with appropriate daylight filters (high pass or band pass filters), the infrared emissions from these markings can be readily detected even during daylight. However, the use of colorants in a functional overlayer, specifically colorants with broad absorption in the visible region, can decrease the daylight detectability of these markings. This however can be overcome to a significant degree by the use of another functional overlayer specifically aimed at converting lower levels of incident daylight radiation into infrared emission. It should be noted that such a functional overlayer, when used in conjunction with another functional overlayer that adjusts the daylight color of the marking, will not only improve the detectability of both the daylight and nighttime emissions but also enable the marking to function as a stealth marking.

Another functional overlayer of the present invention contains selected materials that absorb visible radiation which causes photolytic instability of the underlying photoluminescent materials. The fluorescent materials, whether admixed with phosphorescent materials or not, used in this invention to convert the excitation radiation to infrared emission can be vulnerable to photolytic degradation by radiation within and/or near their absorption spectrum. Use of typical stabilizing agents such as UV absorbers, antioxidants, singlet oxygen scavengers, etc is not sufficient to impart the required degree of photolytic stability. It has been discovered that by modulating radiation near their excitation spectrum with a functional overlayer to selectively filter such radiation, one can significantly increase the stability of such fluorescent materials to photolytic degradation. Care has to be exercised, similar to the case of the functional overlayer for adjusting the daylight color, to ensure that the absorptive materials selected to selectively filter the radiation responsible for the damaging photolytic activity of the photoluminescent material allow charging energy to pass through the functional layer to charge or activate the photoluminescent layer and at the same time allow the resultant infrared emissions to pass back out though the functional overlayer. Examples of absorptive materials that meet the aforementioned criteria are described in the set of examples below.

Another functional overlayer of the current invention can be used to camouflage a printed message. A text message, a graphic message or a combination thereof may be printed with an ink that is normally visible to the naked eye. Such a message can be printed either over the reflective layer, over the photoluminescent layer or over one of the functional overlayers, such as, for example, the functional overlayer that enhances the daylight observability of the photoluminescent markings. As long as there is a functional overlayer that contains selected colorants which absorb visible light over the printed message, such a message will be camouflaged but detectable both at daytime (with appropriate filtration or contrast enhancement) and night time with infrared detecting equipment. As long as the ink used for printing will absorb the infrared emissions from the marking, it will provide a contrast to be visible with infrared detection equipment such as night vision devices. As before, care has to be exercised that the colorants have adequate transparency to both the exciting and emissive radiation.

The above functional overlayers can be used alone to provide one particular desired function or they can be used in combination with each other to provide a combination of more than one function.

The photoluminescent layer of the immediate invention is comprised of photoluminescent phosphorescent materials or photoluminescent fluorescent materials or combinations thereof. When present in the photoluminescent layer, it is generally preferred that the phosphorescent materials be such that they have emissions that are of high intensity and persistence. The phosphorescent materials are generally charged or activated by UV and/or short blue energy that are incident upon it. The emission from the photoluminescent phosphorescent materials exhibits a downward Stokes shift to energy lower than the energy used to excite the photoluminescent phosphor. When the photoluminescent layer contains both phosphorescent materials and fluorescent materials, emissive energy from the phosphorescent materials can be absorbed by a fluorescent material selectively chosen to absorb that energy. The emission energy from this fluorescent material will be downshifted to a lower energy and can be absorbed by a second fluorescent material selected for its ability to absorb such radiation. Additional fluorescent materials can be chosen that further exhibit Stokes shifts until a selected emission is achieved. The selected emission can be chosen to be partially or fully in the infrared regions of the electromagnetic spectrum. Generally, a Stokes shift for a single photoluminescent phosphorescent or photoluminescent fluorescent material ranges from 20 to 100 nm. In order to produce longer Stokes shifts, multiple photoluminescent fluorescent materials can be used to produce a cascading Stokes shift. A cascading Stokes shift is produced by successive absorptions of the emission of one of the photoluminescent materials by another of the photoluminescent fluorescent materials and re-emission at a longer wavelength. When done multiple times Stokes shifts significantly in excess of 50 nm can be created.

As stated above, the photoluminescent layer may contain only photoluminescent fluorescent materials. These materials can be charged or activated by a wide range of electromagnetic radiation from UV to infrared. The fluorescent materials are chosen, as described above, to exhibit cascading Stokes shifts to create a selected emission, which is partially of fully in the infrared regions of the electromagnetic spectrum.

It should be clearly pointed out that when the photoluminescent layer contains a selected combination of phosphorescent and fluorescent materials, it enables the spatial and temporal decoupling of the photoluminescent layer and enables stealth detection. When these marking, whether stealth or not, are activated, emission continues long after the activating energy has been removed or turned off, allowing for detection to occur at a later time, and under stealth conditions. Because the emission continues after activation, the marking, or object containing the marking, can be moved far away from the activating source and detected under stealth conditions, that is, the marking does not need to be activated during detection and furthermore the emission from the marking is not detectable with the naked eye.

Suitable phosphorescent materials are the well known metal sulfide phosphors such as ZnCdS:Cu:Al, ZnCdS:Ag:Al, ZnS:Ag:Al, ZnS:Cu:Al as described in U.S. Pat. No. 3,595,804 and metal sulfides that are co-activated with rare earth elements such as those describe in U.S. Pat. No. 3,957,678. Phosphors that are higher in luminous intensity and longer in luminous persistence than the metal sulfide pigments that are suitable for the present invention include compositions comprising a host material that is generally an alkaline earth aluminate, or an alkaline earth silicate. Examples of such photoluminescent phosphors are as described in U.S. Pat. No. 5,424,006.

High emission intensity and persistence phosphorescent materials can be alkaline earth aluminate oxides having the formula $MO.mAl_2O_3:Eu^{2+}, R^{3+}$ wherein m is a number ranging from 1.6 to about 2.2, M is an alkaline earth metal (strontium, calcium or barium), $Eu^{2+}$ is an activator, and R is one or more trivalent rare earth materials of the lanthanide series, yttrium or bismuth co-activators. Examples of such phosphors are described in U.S. Pat. No. 6,117,362.

High emission intensity and persistence phosphors can also be alkaline earth aluminate oxides having the formula $M_k Al_2O_4:2xEu^{2+}, 2yR^{3+}$ wherein $k=1-2x-2y$, x is a number ranging from about 0.0001 to about 0.05, y is a number ranging from about x to 3x, M is an alkaline earth metal (strontium, calcium or barium), $Eu^{2+}$ is an activator, and R is one or more trivalent rare earth materials (e.g. lanthanum, cerium, praseodymium, neodymium, samarium, gadolinium, terbium, dysprosium, holmium, erbium, thulium, ytterbium, lutetium), yttrium or bismuth co-activators. Examples of such phosphors are described in U.S. Pat. No. 6,267,911B1.

Phosphors that can be used in this invention also include those in which a portion of the $Al^{3+}$ in the host matrix is replaced with divalent ions such as $Mg^{2+}$ or $Zn^{2+}$ and those in which the alkaline earth metal ion ($M^{2+}$) is replaced with a monovalent alkali metal ion such as $Li^+$, $Na^+$, $K^+$, $Cs^+$ or $Rb^+$. Examples of such phosphors are described in U.S. Pat. Nos. 6,117,362. & 6,267,911B1.

High intensity and high persistence silicates can be used in this invention such as has been reported in U.S. Pat. No. 5,839,718. Other phosphorescent materials suitable for this invention can be found in U.S. Pat. No. 5,885,483. Alkaline earth aluminates of the type $MAl_2O_4$, which are described in U.S. Pat. No. 5,424,006, are also suitable for this invention.

Phosphorescent materials described above generally absorb in the UV or near UV/Visible regions of the electromagnetic spectrum.

As can be appreciated, many other phosphors are useful to the present invention. Such useful phosphors are described in Yen and Weber, *Inorganic phosphors: compositions preparation and optical properties*, CRC Press, 2004.

Selected photoluminescent fluorescent materials useful in the current invention in either the photoluminescent underlayer or a functional overlayer include photoluminescent fluorescent materials that absorb in the visible and/or infrared region of the electromagnetic spectrum and emit in the visible and/or infrared region. For example, photoluminescent fluorescent materials that absorb in the visible and emit in the visible region include, but are not limited to, for example, coumarins such as coumarin 4, coumarin 6, and coumarin 337; rhodamines such as rhodamine 6G, rhodamine B, rhodamine 101, rhodamine 19, rhodamine 110, and sulfarhodamine B; phenoxazones including Nile red and cresyl violet; styryls; carbostyryls; stilbenes; oxazines, cyanine dyes, pyrromethene, perylene dyes and fluorescenes. Examples of photoluminescent fluorescent materials that absorb in the visible region of the electromagnetic spectrum and emit in the far visible and infrared regions include, but are not limited to, for example, Nile Blue, IR 140 (CAS#53655-17-7), IR 125 (CAS#3599-32-4), and DTTCI (CAS#3071-70-3). Depending upon the desired infrared wavelength emitting from the markings, fluorescent materials useful in this invention can also include, for example, materials that absorb in the infrared and emit in the infrared. Below in Table 1 are the absorption and emission characteristics of some of the photoluminescent fluorescent materials suitable for the current invention.

TABLE 1

| Fluorescent | CAS # | Max. Absorbance (nm) | Max. Emission (nm) |
|---|---|---|---|
| Coumarin 6 | 38215-35-0 | 458 | 505 |
| Rhodamine 110 | 13558-31-1 | 510 | 535 |
| Rhodamine 19P | 62669-66-3 | 528 | 565 |
| Rhodamine 6G | 989-38-8 | 530 | 556 |
| Nile red | 7385-67-3 | 550 | 650 |
| Nile blue | 53340-16-2 | 633 | 672 |
| IR 676 | 56289-64-6 | 676 | 720 |

IR-676 is 1,1',3,3,3',3'-Hexamethyl-4,5,4',5'-dibenzoindodicarbocyanine

The quantum efficiency of compositions comprising photoluminescent phosphorescent and/or photoluminescent fluorescent materials will be dependent on a number of factors, such as degree of overlap between the emission spectrum of one of the photoluminescent materials with the absorption spectrum of another of the photoluminescent materials and the degree to which the photoluminescent fluorescent materials are molecularly dispersed that is, the aggregation state of the fluorescent materials in the polymer comprising the binding matrix. For the photoluminescent fluorescent materials to be in a very fine state of aggregation in the polymer, it is essential for the photoluminescent fluorescent materials to be in solution in the liquid carrier medium and be compatible with the chosen polymers. It is however possible to preselect an appropriate polymer, dissolve the dye in a suitable solvent, and upon subsequent drying end up with a fluorescent particle which then can be used in the photoluminescent layer.

Selected admixing of photoluminescent phosphorescent materials with photoluminescent fluorescent materials will result in compositions that can be charged or activated by incident electromagnetic energy, for example, by UV and/or short blue visible radiation, and emit partially or fully in the infrared. Since the activated photoluminescent phosphorescent material will continue to emit radiation long after the activating radiation has been removed, the photoluminescent composition will continue to emit radiation partially or fully in the infrared region of the electromagnetic spectrum.

As stated above, the photoluminescent layer contains one or more photoluminescent phosphorescent materials, or one or more photoluminescent fluorescent materials or combinations thereof. In addition, the photoluminescent layer, as well as the functional overlayers, also contains one or more liquid carriers, and one or more polymeric binders. Optionally the layers may contain one or more photostabilizers, one or more rheology modifiers, and one or more dispersing agents.

Beyond the selection of the photoluminescent phosphorescent materials and/or any additional photoluminescent fluorescent materials used to enhance their performance, it should be noted that the emission intensity and/or persistence from a photoluminescent composition is greatly affected by both the way in which the photoluminescent phosphorescent materials are distributed and the additives used, as well as the manner in which that composition is applied.

The improper selection and use of the composition materials, such as binders, dispersing agents, wetting agents, rheology modifiers, photostabilizers, and the like can diminish the emission intensity emanating from the composition. This can occur, for example, due to agglomeration or settling of photoluminescent phosphorescent particles, either during handling of the formulated materials or after application of the formulated materials. The reduction in emission intensity and/or persistence can result from incomplete excitations and/or scattering of emitted radiation. The scattering of photoluminescent emissions can be either due to agglomeration of photoluminescent phosphorescent material or as a consequence of electromagnetic radiation scattering by one or more of the additives selected to stabilize the photoluminescent phosphorescent pigment dispersion. The net result will be lower emission intensity and persistence.

It is important to select only those polymeric binder resins that do not interfere with the charging or activating radiation or with the emission radiation and that are also compatible with the selected photoluminescent materials. It is also desirable that the chosen polymeric materials should have minimal impact on the emission intensity, that is, it should not exhibit any significant quenching of the photoluminance.

Binder resins suitable for the inventive compositions for the photoluminescent layer and the functional overlayers include acrylates, for example NeoCryl® B-818, NeoCryl® B-735, NeoCryl® B-813, and combinations thereof, all of which are available from DSM NeoResins®, polyvinyl chlorides, polyurethanes, polycarbonates, polyesters, and nylons such as Nylon 6 or Nylon 6,6 and combinations thereof.

The liquid carrier for the photoluminescent layer and the functional overlayers can be, for example, any solvent which does not adversely impact the photoluminescent materials and which allows for the solubility of the photoluminescent fluorescent materials selected for the photoluminescent composition. Suitable liquid carriers include glycols, glycol ethers, glycol acetates, ketones, and hydrocarbons such as toluene and xylene.

Suitable rheology modifiers for the photoluminescent layer and the functional overlayers include polymeric urea urethanes and modified ureas, for example, BYK® 410 and BYK® 411 from BYK-Chemie®.

Dispersants suitable for the inventive compositions for the photoluminescent layer and the functional overlayers include acrylic acid-acrylamide polymers, salts of amine functional compounds and acids, hydroxyl functional carboxylic acid esters with pigment affinity groups, and combinations thereof, for example DISPERBYK®-180, DISPERBYK®-181, DISPERBYK®-108, all from BYK-Chemie® and TEGO® Dispers 710 from Degussa GmbH.

Other additives for the photoluminescent layer and the functional overlayers can be incorporated into the inventive compositions, including wetting agents such as polyether siloxane copolymers, for example, TEGO® Wet 270 and non-ionic organic surfactants, for example TEGO® Wet 500, and combinations thereof; and including deaerators and defoamers such as organic modified polysiloxanes, for example, TEGO® Airex 900.

According to the present invention the photoluminescent layer is formulated with the following components: 10%-50% binder resin, 15%-60% liquid carrier, 15%-55% photoluminescent phosphorescent material, 0.5%-10.0% dispersing agent, 0.2%-5.0% rheology modifying agent, 0.1%-3.0% photostabilizer, 0.1%-2.0% de-aerating agent, 0.1%-3.0% wetting agent, and 0.0001%-0.11% photoluminescent fluorescent material.

Components of the functional overlayers designed for color alteration can be from 10%-50% of binder resin, about 15%-50% of liquid carrier, 0.5%-5.0% dispersing agent, 0.2%-3.0% rheology modifying agent, 0.1%-3.0% photostabilizer, 0.2%-2.0% de-aerating agent, 0.2%-3.0% wetting agent, and 0.2%-2.0% colorant.

Components of the functional overlayers designed for photolytic stabilization or for enhancing infrared detectability in daylight can be from 10%-75% of binder resin, about 15%-50% of liquid carrier, 0.5%-5.0% dispersing agent, 0.2%-3.0% rheology modifying agent, 0.1%-3.0% photostabilizer, 0.2%-2.0% de-aerating agent, 0.2%-3.0% wetting agent, and 0.0005%-2.0% photoluminescent fluorescent material.

The functional overlayer that is formulated to alter the daytime color so as to be a stealth marking contains colorants chosen to match the daylight color of the object to which the stealth marking is applied, and hence blends in. In other applications, wherein the stealth marking is applied to objects that typically have non-stealth markings for traditional usage, such as, for example, a roadway marking or an identifying logo etc, the functional overlayer contains colorants that would render a daylight color indicative to a casual observer of the presence of such traditional markings and not a marking deployed for stealth detection. The colorants are further chosen for their ability to allow charging radiation to pass through the functional overlayer as well as the resultant infrared radiation to pass through. Suitable colorants can be chosen by performing spectroanalysis, particularly absorbance/fluorescence scans in the UV, visible and infrared regions of the spectrum. Thus, useful colorants will be those that exhibit low absorbance in both the excitation spectrum of the phosphorescent materials in the photoluminescent layer as well as in the final emissive region. Using this technique, a broad spectrum of colorants, such as from violet to yellow to brown to red, can be found that can be formulated into the functional overlayer. To obtain a specific daytime color, the functional overlayer may be formulated with more than one colorant. Examples of colorants that meet the aforementioned criteria are described in the set of examples below.

The functional overlayer that is formulated to improve photolytic stability contains materials chosen with absorptions in specific regions which are detrimental to the photolytic stability of the photoluminescent materials in the underlying photoluminescent layer. The first step is to determine the damaging radiation for one or more of the photoluminescent materials in the photoluminescent layer. The next step is to choose colorants that not only absorb the damaging radiation but also have the least interference in the excitation spectrum of the photoluminescent materials such as the excitation spectrum of the phosphorescent materials and the final emissive region. Suitable colorants can be chosen by performing spectroanalysis, particularly absorbance/fluorescence scans in the UV, visible and infrared regions of the spectrum.

The functional overlayer that is formulated to improve daylight detectability of the infrared emissions from the markings contains fluorescent materials that are chosen to convert radiation incident upon the marking in daylight either indoors or outdoors, including environments with artificial light sources. The fluorescent materials are selected such that the emission of one materials overlaps with the absorbance of another fluorescent material with this being repeated (similar to selection processes in the photoluminescent underlayer) to effectively cascade the incident radiation into the infrared region of the spectrum. Fluorescent materials in the functional overlayer can be selected to convert specific radiation (including that from artificial sources) into infrared radiation.

A functional overlayer can also be formulated to camouflage a hidden message that will not be observable with the naked eye but with the use of appropriate equipment can be observed. If the message is printed with materials that absorb visible radiation then the functional overlayer will contain materials that absorb that same particular visible radiation so as to render it invisible.

Beyond the selection of the colorants, the functional overlayer will include, for example, one or more liquid carriers, and one or more polymeric binders. Optionally the functional overlayer may contain one or more photostabilizers, one or more rheology modifiers, and one or more dispersing agents. The specifics of these materials have been mentioned above in association with the photoluminescent layers.

Photostabilizers useful in the inventive composition include UV absorbers, singlet oxygen scavengers, antioxidants, and/or mixtures thereof, for example, Tinuvin® 292, Tinuvin® 405, Chimassorb® 20202, Tinuvin® 328, or combinations thereof, all from Ciba® Specialty Chemicals.

The present invention also provides for a reflective layer to be present under the photoluminescent layer that is designed to reflect UV, visible and infrared radiation out through the stealth marking. This will help to intensify the selected infrared emission. The reflecting layer may be any layer that reflects the selected light and includes, for example, formulations that include materials, such as white pigments, such as, for example, titanium oxide that will reflect the photoluminescence emitted from the photoluminescent layer. The reflective layer may be a preformed metal layer, such as, for example, aluminum that will reflect the photoluminescence.

The present invention also relates to methods of creating and using phosphorescent stealth markings.

Photoluminescent objects of the current invention may be made by any of the known methods of manufacture including extrusion or molding to provide solid objects, or coating on surfaces of objects, using a number of coating techniques including spray, dip, lamination, electrostatic, screen, roller, curtain, slot coating or other methods well known in the art.

In coating applications, the photoluminescent layer is coated and dried to provide a photoluminescent layer which emits fully or partially in the infrared region of the electromagnetic spectrum. The functional overlayer is then applied using the same or different coating technique as the photoluminescent layer and then dried. This process is continued until all desired functional coatings have been applied.

The photoluminescent underlayer may only cover a portion of the object. For example, in cases where messages, indicia, graphics or other design functionality is designed the photoluminescent layer may be printed onto the object using such techniques as offset, gravure, letterpress, screen or other printing technique. It should be noted that the functional overlayer is applied to ensure the photoluminescent underlayer is covered.

It should be noted that the functional overlayer may also act as a top coat that protects the marking from various unfriendly environmental and/or handling conditions.

An alternative method of manufacture is to first apply the functional overlayer to a supporting film, such as, for example, Mylar®, followed by drying. Additional functional overcoats are then applied and dried. The coated support film is then placed over a previously coated and dried photoluminescent layer with the functional overlayer in contact with the photoluminescent layer. Pressure is then applied, and optionally heat, to provide intimate contact between the film containing the functional overlayer, or overlayers, and the photoluminescent layer. The support film may then be removed to create a photoluminescent stealth marking.

The above described photoluminescent markings can be used for the purposes of stealth marking, as previously described. The objects containing stealth markings can be charged or activated with electromagnetic radiation, for example, ultraviolet, near ultraviolet or combinations thereof, by a number of convenient methods including metal halide lamps, fluorescent lamps, or any light source containing a sufficient amount of the appropriate visible radiation, UV radiation or both, as well as sunlight, either directly or diffusely, including such times when sunlight is seemingly blocked by clouds. At those times sufficient radiation is present to charge or activate the markings and/or objects containing the markings.

It can readily be seen that activation of the inventive markings and detection of their subsequent emission, can occur at separate times and at separate places. The source of activation can be removed and the markings and/or objects containing the markings will continue to emit radiation in the selected region and be detected, for example, in darkness when there is no activating radiation. Since no activation is required at the time of detection, the possibility of revealing the position of a stealth operator is eliminated. When used for stealth purposes the stealth markings and objects containing the marking can also be detected at long distances from the stealth operator so that the operator's position may be hidden, further adding to the stealth ability of the current invention For the purpose of identification or authentication, stealth or otherwise, a detector that will detect the selected emission signature from the photoluminescent stealth markings and/or objects containing the markings is used. An example of a detection apparatus with amplification is night vision apparatus. Night vision apparatus can detect either visible radiation if present, infrared radiation, or both visible and infrared radiation. The detection apparatus can be designed to detect specific emission signatures. Where necessary, detectors can incorporate amplification capabilities. The detector can be designed to read a specific wavelength of the emission signature of the stealth markings and/or objects containing the marking as well as the photoluminescent stealth marking can be created to emit radiation suitable for a specific detector. As mentioned, because of the nature of the inventive stealth methods and stealth markings, when the markings are enabled for stealth detection, detection can occur at a time and place separate from activation.

Under certain conditions the detection equipment may be adversely impacted by radiation from extraneous sources causing identification or detection of the intended markings and/or objects containing the markings to be difficult due to the inability of the detector to differentiate between emission signature and such spurious radiation. Under these conditions, the detection equipment, for example, night vision apparatus may be fitted with a filter designed to eliminate the extraneous visible radiation, thereby enhancing identification or detection.

The type of image obtained from the selected emission signature can be in the form of a general image emitted by the stealth markings and/or objects containing the marking or it may be in the form of a pattern. It can also have informational properties in the form of alphabetical, numerical, or alphanumeric markings as well as patterns and symbols, such as geometric shapes and designations. In this manner, the stealth detection and identification can be topical, either with up-to-date information, such as times and dates, as well as for messages.

When practicing stealth identification, for the case wherein the emission is only partially in the infrared region of the electromagnetic spectrum, to enhance the undetectability of the visible emission, the functional overlayer is adjusted to absorb such visible radiation thereby further ensuring undetectability by a human observer. Stealth detection and identification described above, either for stealth markings or objects containing such stealth markings, can only be made by using devices designed to detect the selected emission signature.

Detection and identification methods using the current photoluminescent markings and/or objects containing the markings can be deployed for detection and identification of objects, people or animals. Photoluminescent markings can be applied to, for example, military objects to designate friend or foe, as well as trail markings. When such markings are rendered as stealth markings and enabled for stealth detection such stealth markings can be designed to be detected only by selected personnel. Examples of the use of stealth markings for stealth detection include airplane or helicopter landing areas, or stealth markings that reveal the presence or absence of friendly forces.

Detection and identification methods using the current photoluminescent markings and/or objects containing the marking allow for stealth identification, or otherwise, of, for example, stationary combat apparatus, mobile combat apparatus, combat articles of clothing or combat gear either worn by combatants or carried by combatants, tanks, stationary artillery, mobile artillery, personnel carriers, helicopters, airplanes, ships, submarines, rifles, rocket launchers, semi-automatic weapons, automatic weapons, mines, diving equipment, diving clothing, knap-sacks, helmets, protective gear, parachutes, and water bottles.

The current photoluminescent markings and/or objects containing the marking allow for stealth detection and identification, or otherwise, including tagging, tracking and locating transportation vehicles, such as, for example, buses, airplanes, taxi cabs, subway vehicles, automobiles and motorcycles.

Detection and identification methods using the current photoluminescent stealth markings and/or object containing the marking, whether enabled for stealth detection or not, can also be used for applications such as in sports and entertainment such as, for example, in hunting and fishing applications which are designed to identify or detect other hunters or fisherman. Stealth markings can be particularly useful in hunting applications such as, for example, vests, pants, shirts or jackets and the like, wherein accidents can be avoided by using infrared emission detection apparatus for stealthily identifying or detecting other hunters but at the same time, since no visible emission is detectable, avoiding spooking the hunted animal.

Stealth detection and identification compositions that embody stealth markings may be particularly useful for applications requiring security.

The stealth markings and/or object containing the marking of the current photoluminescent stealth markings can also be used in anti-counterfeit applications applicable to a wide variety of goods or objects. Photoluminescent stealth markings and/or objects containing the markings prepared according to the methods described above can be utilized in anti-counterfeit applications such as, for example, currency, anti-piracy applications, such as CDs or DVDs, luxury goods, sporting goods etc. In many of these applications it becomes important that the potential counterfeiter be unaware that the object that is being counterfeited contains a marking and/or object containing the marking that will authenticate the object. The stealth marking can also be coded such as a date code or other identifying code that a counterfeited object would not have.

The current photoluminescent markings can be applied onto carrier materials, such as films, for example, polyester, polycarbonate, polyethylene, polypropylene, polystyrene, rubber or polyvinyl chloride films, or metallic plates, for example, aluminum, copper, zinc, brass, silver, gold, tin, or bronze plates. Other layers can be added to the carrier material such as an adherent material, for example, an adhesive with high or low peel strength or a magnetic material. The carrier material with the photoluminescent markings and/or objects containing the marking applied thereon can either be attached permanently to an object or it can be transferable so that detection and identification can be changed, updated or removed. Such application allows for an object to have the detection and identification capabilities of the current invention without the object itself undergoing a fabrication process. In this application, if information becomes outdated, the carrier material with the photoluminescent stealth markings in the form of a removable film or plate can be replaced by another carrier material with the photoluminescent stealth marking with updated information such as, for example, in safety applications or security applications.

Objects prepared using the current photoluminescent markings and/or objects containing the marking can have low emission intensity by virtue of inadequate reflection of the emitted electromagnetic radiation, either because of surface roughness or because of materials in the object that are absorptive of the selected emission signature. As a result reflective layers or coatings that are reflective of the emissions from the photoluminescent compositions can be used as primers to provide a surface from which the emission signature can reflect. Hence a reflective layer may be first applied either onto a carrier material or onto the object itself followed by one or more photoluminescent markings of the current invention.

In applications including camouflage patterns, or other patterns, more than one color may be used in the functional overlayer. For example, some camouflage, such as desert camouflage, contains four color combinations: tan, brown, dark brown and black. Therefore applying photoluminescent stealth markings to desert camouflage require applying a photoluminescent layer followed by application of a functional overlayer which contains tan, brown, dark brown and black arranged to mimic the desert camouflage pattern. In this way the photoluminescent emission blends in with the camouflage background.

EXAMPLES

Example 1

Stealth Marking

Infrared Emitting Photoluminescent Layer:

Into 54.47 g of ethylene glycol monobutyl ether was admixed 20.35 g of NeoCryl® B-818 (an acrylic resin from DSM NeoResins®). To the admix was added 1.80 g of DisperBYK® 180 (from BYK-Chemie), 0.88 g of TEGO® Wet 270 and 0.57 g of TEGO® Airex 900 (both from Degussa GmbH) with stirring. Then 0.10 g of rhodamine 19P, 0.10 g of dichlorofluorescein, 0.10 g of Nile Blue, 0.10 g of Nile Red, 0.05 g of sulfarhodamine B, 0.01 g of rhodamine 800 and 0.01 g of 3,3'-diethyloxatricarbocyanine iodide were added and mixed until dissolved. 20.35 g of H-13, green phosphor (from Capricorn Specialty Chemicals) was then added. 1.11 g of BYK® 410 (from BYK-Chemie), was then added. The photoluminescent composition thus prepared was coated onto a violet colored wall panel using a wire draw down bar, and dried at 50° C. (<5% solvent) for 12 hours to a dried thickness of 10 mils.

Functional Overlayer #1:

To 91.34 g of Hauthane L-3058 (from C. L. Hauthaway Corp.) was admixed 1.82 g of TEGO® Wet 270 and 1.82 g of Tinuvin® 1130 (from Ciba Specialty Chemicals). To this admixture was added 0.45 g of ORCOBRITE™ Pigment Violet 4BN (from Organic Dyestuffs Corp) and mixing was continued for 30 min. Additional Pigment Violet 4BN was added until the functional layer matched the violet color of the wall panel when coated and dried. Mixing was stopped and the composition was allowed to stand for 1 hr. The composition was coated over the photoluminescent layer using a wire draw down bar and dried at 35° C. for 2 hours to a dried thickness of 3 mils. When dried, the coatings could not be distinguished from the violet colored wall panel and no luminescence was observed.

The wall panel was illuminated by a 150 watt metal halide lamp placed 1 foot away for 15 minutes. The lamp was removed and the room in which the wall panel resided was made pitch black. Over the course of adjusting to the dark, no luminescence could be observed. One hour after removal of the lamp, a Generation 3 proprietary night vision monocular scope was used to observe the wall from a distance of 10 feet. A bright image of the photoluminescent layer was readily seen.

Functional Overlayer #2:

The process of Example 1 was repeated with the following exceptions:
1) The wall panel that was coated was blue violet
2) 0.15 g of ORCOBRITE™ Pigment Blue 3GN 2031 (from Organic Dyestuffs Corp) was added to the functional overlayer composition in place of the Pigment Violet 4BN, with additional dye added if necessary, which resulted in a blue violet overlayer which matched the color of the coated wall panel when dried as described.

Again no luminescence was observed either in ambient light or under pitch black conditions while a bright image was observed when a Generation 3 proprietary night vision monocular scope.

Thus it can be seen that a photoluminescent infrared emitting layer can be overcoated with a functional overlayer that is formulated to cover the emitting layer and hide it from unaided viewing by blending with the background while at the same time allowing both activating radition and infrared emission to pass through. For different colored backgrounds the functional overlayer can be formulated to color-match the background. For situations, such as road markings or doorframes, where a marking is already present the functional overlayer can be formulated to simulate such a marking.

Example 2

Marking with Overlayer to Provide Photolytic Stability

Infrared Emitting Photoluminescent Composition

Into 54.47 g of ethylene glycol monobutyl ether was admixed 20.35 g of NeoCryl® B-818 (an acrylic resin from DSM NeoResins®). To the admix was added 1.80 g of DisperBYK® 180 (from BYK-Chemie), 0.88 g of TEGO® Wet 270 and 0.57 g of TEGO® Airex 900 (both from Degussa GmbH) with stirring. Then 0.10 g of rhodamine 19P, 0.10 g of dichlorofluorescein, 0.10 g of Nile Blue, 0.10 g of Nile Red, 0.05 g of sulfarhodamine B, 0.01 g of rhodamine 800 and 0.01 g of 3,3'-diethyloxatricarbocyanine iodide were added and mixed until dissolved. 20.35 g of H-13, green phosphor (from Capricorn Specialty Chemicals) was then added with mixing. 1.11 g of BYK® 410 (from BYK-Chemie) was then added with mixing.

Functional Overlayer Composition #3:

To 91.34 g of Hauthane L-3058 (from C. L. Hauthaway Corp.) were admixed 1.82 g of TEGO® Wet 270 and 1.82 g of Tinuvin® 1130 (from Ciba Specialty Chemicals). To this admixture was added 0.30 g of ORCOBRITE™ Pigment Violet 4BN, 0.08 g of ORCOBRITE™ Pigment Blue 3G and 0.15 g of ORCOBRITE™ Pigment yellow 4GX HLF (all from Organic Dyestuffs Corp) and mixing was continued for 30 min. Mixing was stopped and the composition was allowed to stand for 1 hr.

Functional Overlayer Composition #4:

To 91.34 g of Hauthane L-3058 (from C. L. Hauthaway Corp.) was admixed 1.82 g of TEGO® Wet 270 and 1.82 g of Tinuvin® 1130 (from Ciba Specialty Chemicals). To this admixture was added 0.30 g of ORCOBRITE™ Pigment Violet 4BN, 0.08 g of ORCOBRITE™ Pigment Blue 3G and 0.30 g of ORCOBRITE™ Pigment yellow 4GX HLF (all from Organic Dyestuffs Corp) and mixing was continued for 30 min. Mixing was stopped and the composition was allowed to stand for 1 hr.

Infrared Emitting Photoluminescent Markings

A) The photoluminescent composition was coated onto 10 mil white polyethylene terephthalate using a wire draw down bar, and dried at 50° C. (<5% solvent) for 12 hours to a dried thickness of 6.80 mils.
B) The photoluminescent marking from A) was overcoated with functional composition #3 using a Bird-style applicator and dried 35° C. (<5% solvent) for 2 hours to a dried thickness of 1.75 mils.
C) The photoluminescent marking from A) was overcoated with functional composition #4 using a Bird-style applicator and dried 35° C. (<5% solvent) for 2 hours to a dried thickness of 1.75 mils.

Photolytic Stability Study

The IR emitting photoluminescent markings, A-C above, were charged in a light chamber consisting of blue actinic and cool white fluorescent lamps with an energy output of 1410 foot-candles as measured by an Extech LT 300 Light Meter. The markings were placed at a distance of 3 inches from the lights for 10 minutes. The now charged material was placed in a light tight chamber and the emitting energy was measured using an International Light High-Gain Detector, Model #SHD033/U, equipped with a silicon photodiode detector. Measurements was made using a high-pass SCS695 filter #27398 which measured all emission above 695 nm, before and after exposure to photolysis.

The IR emitting photoluminescent markings, A-C above, were then tested for output luminance after photolysing radiation. The markings were placed in an Atlas Ci35A Weather-o-meter using borosilicate inner and outer filters for 100 hrs. Illumination was provided by a Xenon Arc lamp with irradiance equal to 0.75 Watts/meter at a peak output 320 nm. The temperature of the Weather-o-meter was 73° C. The exposed markings were placed in a light tight chamber and the emitting energy was measured using an International Light High-Gain Detector, Model #SHD033/U, equipped with a silicon photodiode detector. The measurement was made using a high-pass SCS695 filter #27398 from which measured all emission above 695 nm. The results of this study are presented in Table I.

TABLE I

|  | IR Emission after 0 hrs photolysis (mcd/m$^2$/mil) | IR Emission after 100 hr photolysis (mcd/m$^2$/mil) | % loss |
|---|---|---|---|
| A) IR Emitting Photoluminescent Marking | 8.8 | 2.4 | 72.7% |
| B) IR Emitting Photoluminescent Marking with Functional Overlayer #3 | 6.0 | 4.9 | 18.3% |
| C) IR Emitting Photoluminescent Marking with Functional Overlayer #4 | 6.2 | 4.4 | 29.0% |

As can readily be seen, the photolytic stability of the IR emitting photoluminescent layer is greatly improved using either of the inventive anti-photolysis functional compositions as an overlayer. The functional overcoat compositions were not optimized to fully eliminate any blocking of the infrared emission. The yellow pigment used in the functional composition has a characteristic absorbance that "tails" into the excitation region of the phosphorescent material resulting in some reduction of the IR emission. Judicious selection of yellow pigments in the formulation whose absorbencies either do not "tail" into, or are lowest in, the excitation region of the phosphorescent material, would have resulted in a higher retention of infrared emission.

We claim:

1. A photoluminescent marking comprising:
   (a) a photoluminescent layer comprising selected photoluminescent materials and,
   (b) one or more functional overlayers over the photoluminescent layer, wherein the marking emits fully or partially in the infrared region of the electromagnetic spectrum and wherein the one or more functional overlayers comprise at least one of:
      (i) selected colorant materials that adjust the daylight color of the marking to render it a stealth marking by either blending imperceptibly with the surrounding area of an object to which the marking is applied, or, when applied to objects that typically have non-photoluminescent markings for traditional usage, renders a daylight color indicative of such traditional markings, or
      (ii) selected colorant materials that increase the photolytic stability of the marking, or
      (iii) selected fluorescent materials that enhance the daylight observability of the infrared emission, or
      (iv) selected colorants to prevent the observability with the naked eye of a printed message that is printed on the photoluminescent layer or any of the functional overlayers (ii) or (iii) above.

2. The marking of claim 1, wherein the materials in the one or more functional overlayers are selected to exhibit at least one of:
   (a) minimal absorbance in the region of the electromagnetic spectrum that activates the photoluminescent materials in the photoluminescent layer beneath and,
   (b) minimal absorbance of a final infrared emission.

3. The marking of claim 2, wherein the photoluminescent layer is comprised of photoluminescent phosphorescent materials, photoluminescent fluorescent materials, or combinations thereof.

4. The marking of claim 2, wherein the photoluminescent layer is comprised of selected photoluminescent phosphorescent materials or selected photoluminescent phosphorescent and fluorescent materials to enable stealth detection.

5. A photoluminescent marking comprising:
(a) a photoluminescent layer comprising selected photoluminescent materials,
(b) one or more functional overlayers over the photoluminescent layer, and
(c) a reflective layer;
   wherein the marking emits fully or partially in the infrared region of the electromagnetic spectrum and wherein the one or more functional overlayers comprise at least one of:
   (i) selected colorant materials that adjust the daylight color of the marking to render it a stealth marking by either blending imperceptibly with the surrounding area of an object to which the marking is applied, or, when applied to objects that typically have non-photoluminescent markings for traditional usage, renders a daylight color indicative of such traditional markings, or
   (ii) selected colorant materials that increase the photolytic stability of the marking, or
   (iii) selected fluorescent materials that enhance the daylight observability of the infrared emission, or
   (iv) selected colorants to prevent the observability with the naked eye of a printed message that is printed on the reflective layer or on the photoluminescent layer or any of the functional overlayers (ii) or (iii) above.

6. The marking of claim 5, wherein the materials in the one or more functional overlayers are selected to exhibit at least one of:
   (a) minimal absorbance in the region of the electromagnetic spectrum that activates the photoluminescent materials in the photoluminescent layer beneath and,
   (b) minimal absorbance of a final infrared emission.

7. The marking of claim 6, wherein the photoluminescent layer is comprised of photoluminescent phosphorescent materials, photoluminescent fluorescent materials, or combinations thereof.

8. The marking of claim 6, wherein the photoluminescent layer is comprised of selected photoluminescent phosphorescent materials or selected photoluminescent phosphorescent and fluorescent materials to enable stealth detection.

9. A method of detecting a photoluminescent marking, the method comprising:
(a) activating or charging the photoluminescent marking on an object, the photoluminescent marking comprising a photoluminescent layer with photoluminescent materials and one or more functional overlayers over the photoluminescent layer, wherein the marking emits fully or partially in the infrared region of the electromagnetic spectrum;
   wherein the one or more functional overlayers comprises at least one of:
   (i) selected colorant materials that adjust the daylight color of the marking to render it a stealth marking by either blending imperceptibly with the surrounding area of an object to which the marking is applied, or, when applied to objects that typically have non-photoluminescent markings for traditional usage, renders a daylight color indicative of such traditional markings, or
   (ii) selected colorant materials that increase the photolytic stability of the marking, or
   (iii) selected fluorescent materials that enhance the daylight observability of the infrared emission, or
   (iv) selected colorants to prevent the observability with the naked eye of a printed message that is printed on the reflective layer or on the photoluminescent layer or any of the functional overlayers (ii) or (iii) above; and
(b) detecting an infrared emission from the marking.

10. The method of claim 9, wherein the materials in the one or more functional overlayers are selected to exhibit at least one of:
   (a) minimal absorbance in the region of the electromagnetic spectrum that activates the phosphorescent materials in the photoluminescent layer beneath and,
   (b) minimal absorbance of a final infrared emission.

11. The method of claim 10, wherein the photoluminescent layer is comprised of selected photoluminescent phosphorescent materials, photoluminescent fluorescent materials, or combinations thereof.

12. The method of claim 10, wherein the photoluminescent layer is comprised of selected photoluminescent phosphorescent materials or selected photoluminescent phosphorescent and fluorescent materials to enable stealth detection.

13. The method as in claim 9, wherein the object comprises one of a landing area, a combat apparatus, combat gear, a weapon, and an article of clothing.

14. The method as in claim 9, wherein the object comprises transportation vehicle.

15. The method as in claim 9, further comprising obtaining information from the marking.

16. A method of detecting a photoluminescent marking comprising:
(a) activating or charging the photoluminescent marking on an object, the photoluminescent marking comprising a reflective layer and a photoluminescent layer that comprises photoluminescent materials over the reflective layer and, one or more functional overlayers over the photoluminescent layer, wherein the marking emits fully or partially in the infrared region of the electromagnetic spectrum;
   wherein the functional overlayer comprises at least one of:
   (i) selected colorant materials that adjust the daylight color of the marking to render it a stealth marking by either blending imperceptibly with the surrounding area of an object to which the marking is applied, or, when applied to objects that typically have non-photoluminescent markings for traditional usage, renders a daylight color indicative of such traditional markings, or
   (ii) selected colorant materials that increase the photolytic stability of the marking, or
   (iii) selected fluorescent materials that enhance the daylight observability of the infrared emission, or
   (iv) selected colorants to prevent the observability with the naked eye of a printed message that is printed on the reflective layer or on the photoluminescent layer or any of the functional overlayers (ii) or (iii) above; and
(b) detecting an infrared emission from the marking.

17. The method of claim 16, wherein the materials in the one or more functional overlayers are selected to exhibit at least one of:
   (a) minimal absorbance in the region of the electromagnetic spectrum that activates the phosphorescent materials in the photoluminescent layer beneath and,
   (b) minimal absorbance of the final infrared emission.

18. The method of claim 17, wherein the photoluminescent layer is comprised of selected photoluminescent phosphorescent materials, photoluminescent fluorescent materials, or combinations thereof.

19. The method of claim 17, wherein the photoluminescent layer is comprised of selected photoluminescent phosphorescent materials or selected photoluminescent phosphorescent and fluorescent materials to enable stealth detection.

20. A method for marking an object, the method comprising:
(a) selecting the object; and,
(b) applying the marking to the object;
wherein the applying comprises providing the marking that comprises a photoluminescent layer comprising selected photoluminescent materials and, one or more functional overlayers over the photoluminescent layer, wherein the marking emits fully or partially in the infrared region of the electromagnetic spectrum and wherein the one or more functional overlayers comprise at least one of:
selected colorant materials that adjust the daylight color of the marking to render it a stealth marking by either blending imperceptibly with the surrounding area of an object to which the marking is applied, or, when applied to objects that typically have non-photoluminescent markings for traditional usage, renders a daylight color indicative of such traditional markings, and
selected colorant materials that increase the photolytic stability of the marking, and
selected fluorescent materials that enhance the daylight observability of the infrared emission, and
selected colorants to prevent the observability with the naked eye of a printed message that is printed on the photoluminescent layer or any of the functional overlayers.

21. The method as in claim 20, wherein the applying comprises by at least one of spraying, dipping, coating, laminating and attaching a carrier comprising the marking to the object.

22. The method as in claim 21, further comprising providing the marking with a reflective layer.

* * * * *